UNITED STATES PATENT OFFICE.

REUBEN BANES, OF CLARKE COUNTY, OHIO.

IMPROVEMENT IN LINIMENTS.

Specification forming part of Letters Patent No. 211,830, dated February 4, 1879; application filed January 8, 1878.

*To all whom it may concern:*

Be it known that I, REUBEN BANES, of the county of Clarke and State of Ohio, have invented a new and useful Compound, which compound is fully described in the following specification.

This invention relates to that class of compounds used as balms, liniments, or embrocations for external application in the cure of diseases requiring specific external remedies; and consists in a composition formed by mixing the following articles together in the manner hereinafter named.

To prepare this compound, which I designate a "balm" on account of its rapid soothing and curative properties, I take distilled petroleum sixteen (16) parts, and dissolve in it as much gum-camphor as it will take up, which is about two (2) parts. I then add to this one (1) part of pure spirits of turpentine. After mixing these thoroughly together I add one (1) part of pure olive-oil and one part of crude rock-oil. The whole is then intimately mixed, and to this mixture one-sixteenth ($\frac{1}{16}$) part of the oil of citronella is added. This latter disguises the unpleasant and disagreeable odor from the distilled petroleum and crude rock-oil used in the compound, which would otherwise render it obnoxious to many persons, and it does not detract from its curative powers.

This compound I use for all diseases in which an external remedy is indicated—for rheumatism, neuralgia, sprains, burns or scalds, frost-bites, &c.; also, in catarrh, diphtheria, quinsy, and all diseases of the throat, lungs, and breast. It is used also in diseases of horses—in distemper, sprains, sweeny, scratches, galls, collar-boils, sore back, &c. It is a specific in foot-evil, or thrush, and in swollen glands, curbs, or sprained tendon, blood-spavin, and weakness of the back and loins; in sore tongue being applied by drawing out the tongue and bathing it with the balm.

In all cases it is applied by bathing the affected parts freely, and excluding the air as much as possible till it is absorbed.

As an improvement upon Patent No. 48,198, I claim—

A compound for a balm or liniment adapted to be used as an external remedy in disease, composed of distilled petroleum, gum-camphor, spirits of turpentine, olive-oil, crude rock-oil, and oil of citronella, as herein set forth.

REUBEN BANES.

Attest:
  B. C. CONVERSE,
  G. W. BANES.